United States Patent
Burek et al.

(10) Patent No.: US 10,234,636 B2
(45) Date of Patent: Mar. 19, 2019

(54) COMPACT ADAPTER MODULE FOR INSTALLATION AT CUSTOMER PREMISES

(71) Applicant: OFS Fitel, LLC, Norcross, GA (US)

(72) Inventors: Denis E Burek, Cumming, GA (US); Willard C White, Suwanee, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/258,383

(22) Filed: Sep. 7, 2016

(65) Prior Publication Data

US 2017/0285272 A1    Oct. 5, 2017

Related U.S. Application Data

(60) Provisional application No. 62/347,711, filed on Jun. 9, 2016, provisional application No. 62/318,445, filed on Apr. 5, 2016.

(51) Int. Cl.
*G02B 6/38* (2006.01)
*H01R 31/06* (2006.01)

(52) U.S. Cl.
CPC ......... *G02B 6/3825* (2013.01); *G02B 6/3893* (2013.01); *G02B 6/3897* (2013.01); *H01R 31/06* (2013.01)

(58) Field of Classification Search
None
See application file for complete search history.

(56) References Cited

U.S. PATENT DOCUMENTS

| | | | |
|---|---|---|---|
| 3,668,324 A | 6/1972 | Firestone | |
| 4,241,974 A | 12/1980 | Hardesty | |
| 4,482,200 A | 11/1984 | Willenborg | |
| 4,488,008 A | 12/1984 | Dellinger et al. | |
| 4,945,559 A | 7/1990 | Collins et al. | |
| 5,349,134 A | 9/1994 | Russell | |
| 5,354,207 A | 10/1994 | Chikano | |
| 6,522,824 B2 | 2/2003 | Dagley et al. | |
| 6,591,053 B2 | 7/2003 | Fritz | |
| 8,147,147 B2 | 4/2012 | Khemakhem et al. | |
| 8,818,157 B2 * | 8/2014 | Burek .................. | G02B 6/4457 385/135 |
| 9,261,663 B2 * | 2/2016 | Loeffelholz .......... | G02B 6/4453 |
| 9,395,506 B2 | 7/2016 | Simmons | |
| 9,632,267 B1 * | 4/2017 | Burek .................. | G02B 6/4442 |

(Continued)

*Primary Examiner* — Tina M Wong
(74) *Attorney, Agent, or Firm* — Leo Zucker, Esq.

(57) ABSTRACT

A compact adapter module for installation at customer premises includes a base for mounting on a supporting surface, and a cover. The base is constructed for mounting a connector adapter operative to connect two communication lines to one another at a given location along a routing path at customer premises. A cover protectively encloses the adapter and connectors mated to the adapter which terminate the lines. Space inside the covered module is limited substantially for storing only the adapter and mated connectors, so the module is compact in size and unobtrusive when mounted at the given location. The lines are received at two ports of the module, and an edge of the base is flush with the supporting surface at each port so the lines can be adhered directly to the supporting surface at the ports. Any adverse visual impact of the lines at the module is therefore minimized.

12 Claims, 3 Drawing Sheets

(56) References Cited

U.S. PATENT DOCUMENTS

| | | | |
|---|---|---|---|
| 2010/0080524 A1* | 4/2010 | Ciechomski | G02B 6/4441 |
| | | | 385/135 |
| 2014/0241667 A1 | 8/2014 | Cote et al. | |
| 2016/0033733 A1* | 2/2016 | Burek | G02B 6/4457 |
| | | | 385/135 |
| 2017/0276887 A1* | 9/2017 | Allen | G02B 6/3897 |
| 2018/0100981 A1* | 4/2018 | Van Baelen | G02B 6/4446 |
| 2018/0113268 A1* | 4/2018 | Van Baelen | G02B 6/4457 |

* cited by examiner

COMPACT ADAPTER MODULE FOR INSTALLATION AT CUSTOMER PREMISES

CROSS REFERENCE TO RELATED APPLICATIONS

This application claims priority under 35 U.S.C. § 119(e) of U.S. Provisional Patent Applications No. 62/318,445 filed Apr. 5, 2016, titled "Compact Point of Entry Multiple Dwelling Unit InvisiLight Module," and No. 62/347,711 filed Jun. 9, 2016, titled "Alternative Route Solutions For Routing InvisiLight® Optical Fiber." The entire contents of both applications are incorporated by reference.

BACKGROUND OF THE INVENTION

Field of the Invention

The present invention relates to modules or boxes for enclosing connector adapters and associated connectors, and particularly to an adapter module for installation at customer premises.

Discussion of the Known Art

The deployment of desktop optical network terminals (ONTs) at premises of network users is increasing. ONTs can be conveniently located, for example, near a TV set top box, an Internet modem, or other telecommunications device served by a network. An optical fiber is routed at the premises to connect the ONT to a service module that is typically installed at an entrance to the premises by the network provider. The fiber routing at the premises should be performed at minimal cost and with little visibility, if any, to occupants of the premises when completed.

Wire staples can be used to fasten an optical fiber to a wall, molding, or other supporting surface over a determined routing path at the premises quickly and at low cost. Notwithstanding, customers often prefer to use special moldings or conduits to keep fibers and cables completely hidden from view inside their premises. Also, if not carefully inserted, staples can physically damage the supporting surface and impair or break an optical fiber as well. Therefore, for customers who want to conceal all fibers and cables routed at their premises, expensive hardware and additional installation time are required.

A procedure that allows an installer to route and bond an optical fiber over exposed surfaces, grooves, and corners at customer premises quickly, safely, and with little or no permanent visual impact is therefore very desirable. Materials and instructions for performing such a procedure are available from OFS Fitel, LLC, under the registered mark InvisiLight®. See U.S. Pat. No. 8,906,178 (Dec. 9, 2014) and U.S. Pub. 2016/0097911 (Apr. 7, 2016), both of which are incorporated by reference. During an InvisiLight installation, a consumer grade, low odor, nonhazardous, water based adhesive is used to bond buffered fibers or jacketed indoor cables to walls, ceilings, and other surfaces along a determined routing path at the premises. Water based adhesives are preferable since they can be applied in areas that lack ventilation, cleaned away with soap and water, and shipped worldwide without restrictions.

Known procedures for routing a fiber inside a home or multiple dwelling building usually require an installer to attach the fiber to supporting surfaces over the routing path while the fiber is simultaneously unwound from a supply spool. The installer typically starts at a provider service module located near an entrance to the premises, and ends at a termination point inside the premises, e.g., a fiber storage module mounted in the vicinity of an ONT. See U.S. Pat. No. 8,818,157 (Aug. 26, 2014) which is assigned to the assignee of the present invention and incorporated by reference. The mentioned '157 patent discloses an optical fiber storage module configured so that after a length of fiber is unwound from a supply spool and routed at the premises, the spool and any remaining fiber thereon can be mounted and enclosed inside the module for storage. Also, it is sometimes expedient for an installer to reverse the foregoing procedure by starting to route the fiber from a termination point inside the premises (e.g., the ONT), and ending at the provider service module near the premises entrance.

For the mentioned InvisiLight fiber installations, it is preferable for the fiber to be adhered directly to supporting surfaces or substrates over the entire routing path so as to avoid or minimize any adverse visual impact of the fiber. See, for example, applicant's U.S. Pat. No. 9,874,712 (Jan. 23, 2018), which discloses a module for supplying and storing an optical fiber, wherein the fiber can be adhered directly to a supporting surface at the module.

If the routing path at the premises is longer than a single available length of fiber, then two lengths of fibers must be connected to one another for routing over the length of the path. The connection is made, for example, by terminating an end of each fiber with a connector, and mating each connector to a corresponding face of a connector adapter. Not just for aesthetic reasons but also to ensure system integrity, the adapter should not be left with its mated connectors in an unprotected state at the premises. Modules capable of housing an adapter with mated connectors do exist, but the known modules have additional space inside them for storing, inter alia, unused (i.e., slack) lengths of fibers and fusion splices. See, e.g., applicant's U.S. Pat. No. 9,632,267 (Apr. 25, 2017), which is incorporated by reference. That is, the size and volume of the known modules are larger than needed to store only the adapter with mated connectors. The modules are therefore subject to complaints if installed openly at a customer premises and only for the purpose of connecting two lengths of fiber for routing at the premises.

SUMMARY OF THE INVENTION

According to the invention, an adapter module for use at customer premises includes a base for mounting on a supporting surface wherein the base is constructed for mounting a connector adapter having first and second faces, and configured to mate with connectors that terminate associated lengths of communication lines so that the lines are operatively connected to one another. A cover encloses the adapter after the adapter is mounted with the mated connectors on the base. The base and the cover are dimensioned and configured to form space inside the module that is substantially limited for storing only the adapter with the mated connectors.

The module has two ports each of which receives one of the lines to be connected to the other line via the adapter. At each module port, an edge of the base is formed to be substantially flush the supporting surface so that the lines can be adhered directly to the surface at the ports, thus avoiding or minimizing any adverse visual impact of the lines at or near the module.

According to another aspect of the invention, a method of operatively connecting two lengths of communication lines to one another at a given location along a determined routing path at customer premises, includes providing a connector adapter having a pair of connection faces, and mating a connector at one end of each line to a corresponding connection face of the adapter. The inventive adapter module is mounted on a supporting surface at the given location along the routing path at the premises, and the adapter is mounted with the mated connectors in the adapter module.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

As used herein, the terms "user" and "customer" are used interchangeably to mean a natural person or a legal entity that uses telecommunication services offered by a network provider including, e.g., Internet access, telephony, television, or other information or data streams wherein the services require the installation of one or more communication lines at a location where the services are used by the person or entity (e.g., private home, apartment, or office). The term "communication line" is meant to include an optical fiber or cable, a copper wire or cable, or a hybrid cable. Further, the words "premises," "home," and "residence" are used interchangeably to mean the home, office, or other living unit where the telecommunication services are provided for the user.

Figure 1:
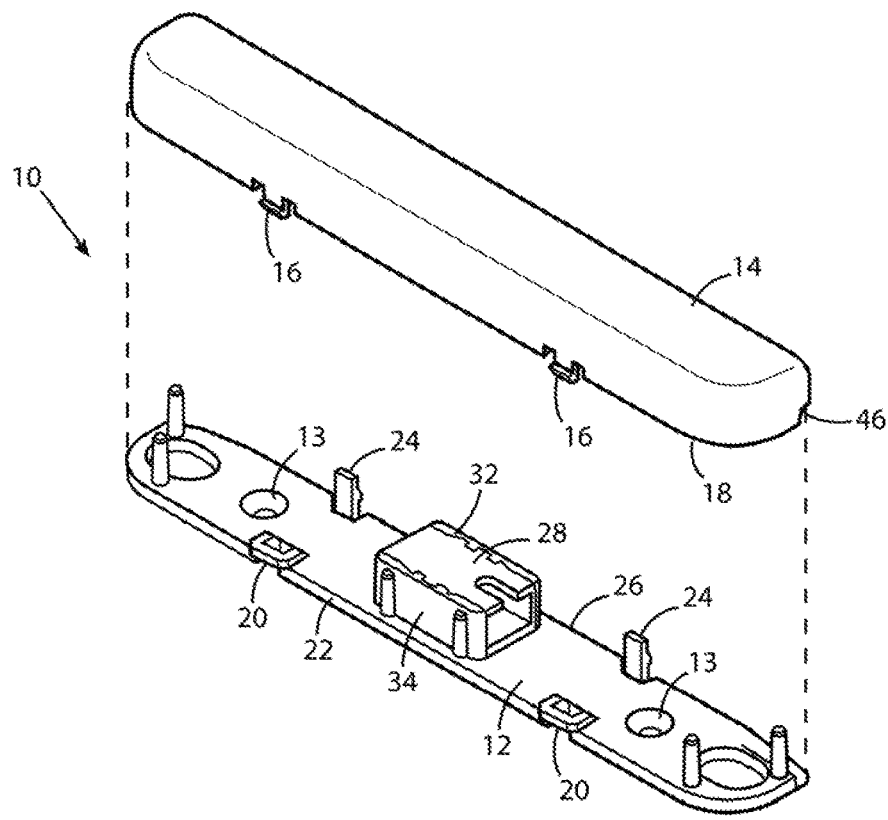
FIG. 1 is an assembly view of an adapter module according to the invention, including a base and a cover.

FIG. 1 is an assembly view of an adapter module 10 according to the invention. The module 10 includes an elongated, generally rectangular base 12, and a complementary shaped cover 14 constructed to be snap fit or otherwise removably fastened onto the base 12. In the illustrated embodiment, the cover 14 has a pair of downwardly projecting tabs 16 along a bottom edge 18 of the cover, and a corresponding pair of ears 20 are formed along a front edge 22 of the base 12 to receive the tabs 16 when the cover 14 is closed over the base 12 as shown in FIG. 2.

Figure 5:
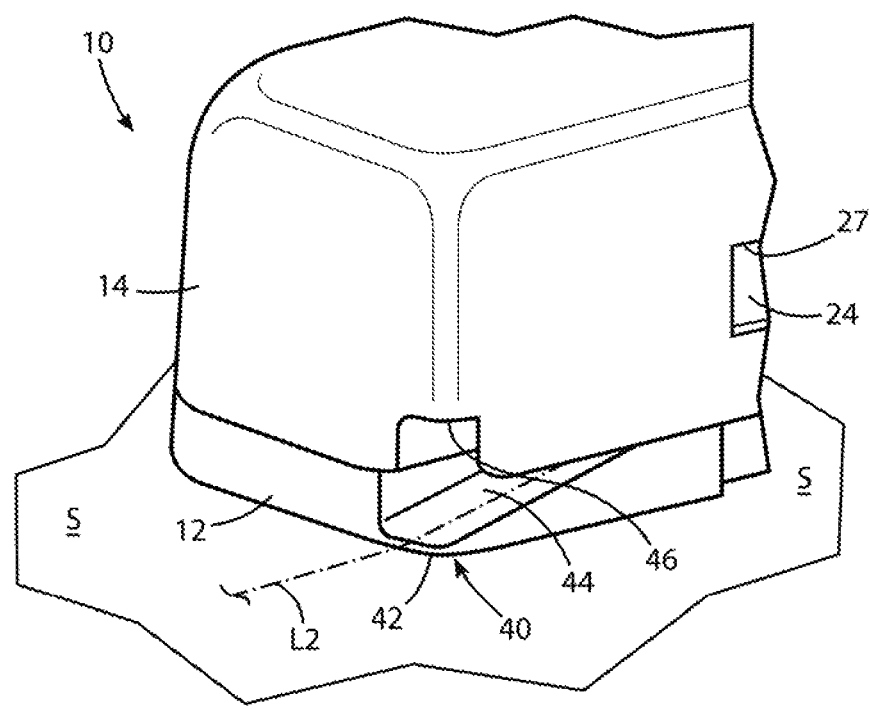
FIG. 5 is an enlarged view of the right side of the closed adapter module in FIG. 2 as seen from the rear, and shows one of two ports of the module.

Two posts 24 adjacent to a rear edge 26 of the base 12 extend upward, and like the ears 20 along the front edge 22 of the base, are configured to engage and hold the cover 12 in a closed position over the base. As seen in FIG. 5, a barbed upper portion of each post 24 is received in a corresponding slot 27 in a rear wall of the cover 14 when the cover is closed on the base 12. Other means for retaining the cover 14 on the base 12 will be apparent to those skilled in the art. With the cover 14 in the closed position in FIG. 2, the module 10 encloses and protects components that are stored or contained inside the module as detailed below. The base 12 also has one or more openings 13 for passing screws or other fasteners to fasten the base on a supporting surface, for example, a wall or a molding at customer premises.

The base 12 and the cover 14 of the module 10 may be molded from polypropylene copolymer or an equivalent material that meets applicable building codes concerning smoke and flammability. Typical dimensions for the module 10 when closed (FIG. 2) are overall length L=6.500 inches, width W=0.904 inch, and depth D=0.540 inch.

Figure 2:
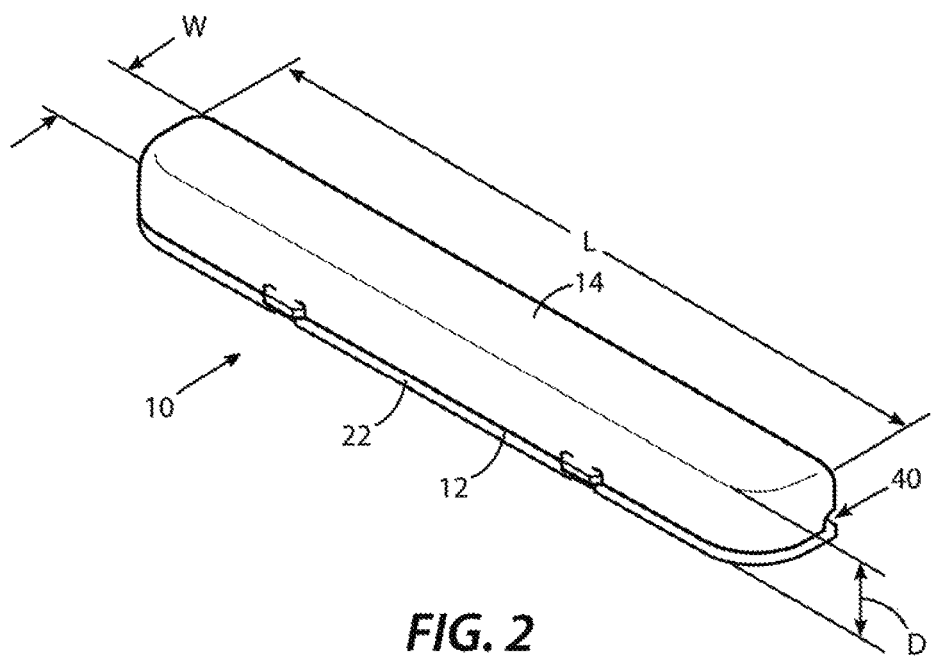
FIG. 2 is a view of the adapter module in FIG. 1 with the cover in a closed position on the base.
Figure 3:
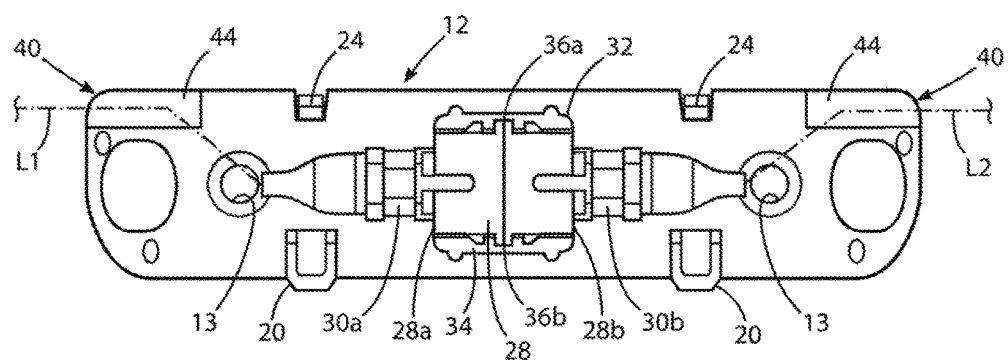
FIG. 3 is a plan view of the base of the inventive module, including a connector adapter mounted on the base with associated mating connectors.
Figure 4:
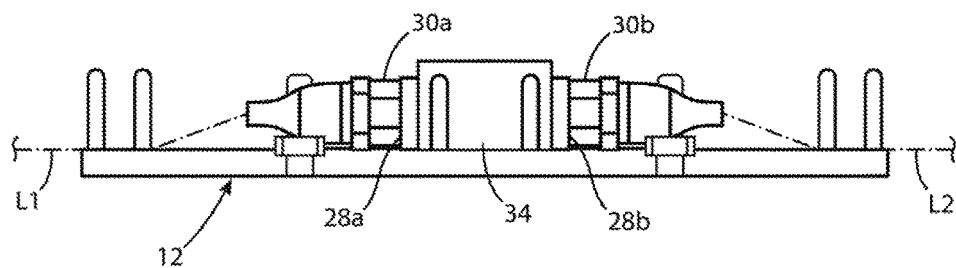
FIG. 4 is an elevational view of the adapter base in FIG. 3.

When closed as in FIG. 2, the module 10 has a compact, aesthetically pleasing appearance. The module is capable of receiving optical fibers or other communication lines having outer diameters ranging from about 900 µm to 4.2 mm. The dimensions of the module 10 are such that the capacity of the module is substantially limited to storing only a connector adapter 28 when mounted on the base 12, and first and second connectors 30a, 30b when mated to connection faces 28a, 28b at opposite ends of the adapter 28 as shown in FIGS. 3 and 4. Unlike existing fiber storage modules, the module 10 is not configured to store additional components such as, e.g., fusion splices, supply spools, slack fiber, or the like.

The adapter 28 is generally rectangular solid in shape and is mounted between a pair of opposed tabs or guides 32, 34 that extend upward from the base 12. Vertical flanges 36a, 36b project from opposite side walls of the adapter 28, intermediate the first and the second connection faces 28a, 28b. Each of the opposed guides 32, 34 has a vertical recess for receiving one of the adapter flanges 36a, 36b, thus preventing the adapter 28 from axial displacement once the adapter is inserted between the guides 32, 34.

The adapter 28 is configured operatively to connect two lengths of optical fibers L1, L2 terminated by the connectors 30a, 30b to one another. See FIG. 3. In the illustrated embodiment, adapter 28 and connectors 30a, 30b are type SC optical components. It will be understood, however, that the adapter and the connectors may be other types of optical components, e.g., LC Duplex, or be constructed for use with certain types of copper wire or hybrid communication lines that are routed over a given path at customer premises.

Figure 6:
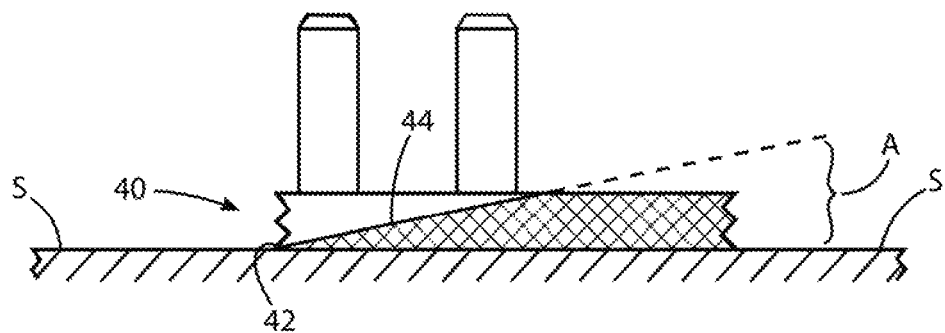
FIG. 6 is a sectional view of the port in FIG. 5.

FIG. 5 is a view of the right side of the closed module 10 in FIG. 2, showing one of two ports 40 provided at the rear corners of the module. See FIG. 3. Each port 40 is configured to receive one of two communication lines for connection to the adapter 28, and to allow each line to maintain contact with a wall or other surface S to which the line is adhered and on which the module 10 is mounted. FIG. 6 is a sectional view of the fiber port 40 in FIG. 5.

At each port 40, a side edge 42 of the module base 12 is formed to be substantially flush with the surface S, wherein the width of the side edge 42 is, e.g., about 0.181 inch (4.58 mm). A narrow rectangular area 44 of the base 12 at each port 40 is inclined from the side edge 42 at an angle A of approximately 8 degrees with respect to the surface S. The cover 14 has cutouts 46 at each rear corner of the cover to provide safe clearance for communication lines received at the module ports 40 when the module is closed by the cover 14. Because the side edge 42 of the base 12 at each port 40 is substantially flush with the surface S, communication lines can be adhered directly to the surface S at the module ports 40 and thereby minimize or avoid any adverse visual impact of the lines at or near the module 10.

It will be appreciated that when the length of a routing path between two termination points at a customer premises exceeds the length of an available communication line, an installer can connect two lengths of communication lines to one another for routing between the termination points via the adapter 28, and store the connection protectively inside the module 10. The location of the connection along the entire routing path then determines the location at which the module 10 will be mounted at the premises. As explained further below, once the connection is made, the module base 12 is fastened on a wall or other support surface S at the determined location. The adapter 28 is then mounted on the base 12 with the connectors 30a, 30b, and the module cover 14 is fastened to the base so the adapter and the connectors are safely stored in the module 10. Because there is no need for line slack, the lines can remain taut inside the module 10.

Also, because the module base 12 is preferably fastened to the surface S before the adapter and connectors are mounted on the base, there is no possibility that fibers or other delicate communication lines entering the module ports 40 can be damaged by fastening screws when driven into the surface S through the openings 13 in the base. An installation featuring the use of the inventive module 10 at a customer premises may therefore proceed as follows.

1. Connectors 30a, 30b terminating the ends of the lines to be connected are mated to the adapter faces 28a, 28b to establish the connection. One of the lines is adhered with an adhesive to a wall or other surface S along a portion of the routing path at the premises, up to the location of the connection. The other line is not adhered to a surface at this time.

2. The installer places a piece of tape over the adhered line near the connection, to ensure the line is not pulled away from the surface S when the end of the line is handled, and to support the weight of the other line which is not yet adhered to the surface. The adapter 28 is then mounted with the mated connectors 30a, 30b on the module base 12, the base is placed at the mounting location for the module on the surface S, and the positions of the mounting holes 13 in the base are marked on the surface S by inserting a pencil through the holes.

3. The adapter 28 is removed from the base 12 with the connectors 30a, 30b, the openings 13 in the base are aligned with the corresponding pencil marks on the surface S, and the base is fastened by driving screws into the surface through the openings 13.

4. The adapter 28 is mounted again with the mated connectors 30a, 30b on the module base 12, and the installer fastens the cover 14 onto the base.

5. The installer removes the tape that was placed over the adhered line, and begins to adhere the other line to a supporting surface over the remainder of the routing path at the premises.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. An adapter module for use at customer premises, comprising:

an elongated base configured for mounting on a supporting surface;

a connector adapter formed and dimensioned for mounting on the base, wherein the connector adapter has first and second connection faces at opposite ends of the adapter configured to mate with connectors at the ends of first and second communication lines so that the lines are operatively connected to one another, and the connector adapter has opposite side walls intermediate the first and the second connection faces;

an elongated cover constructed and arranged to snap fit or otherwise removably fasten onto the base for protectively enclosing the connector adapter with the connectors at the ends of the first and the second communication lines mated to the connection faces of the connector adapter when the cover is fastened to the base, wherein the base and the cover are dimensioned and configured so that space inside the adapter module is substantially limited for storing only the connector adapter when mounted on the base, and the connectors at the ends of the communication lines when the connectors are mated to the connection faces of the connector adapter;

guides extending vertically upward from the base for receiving the opposite side walls of the connector adapter, wherein the guides are configured and arranged so that before the cover is fastened onto the base, the connector adapter is mountable and removable from between the guides with the connectors at the ends of the communication lines mated to the connection faces of the connector adapter;

the base and the cover of the adapter module define two ports each of which is located and configured to receive a corresponding one of the communication lines, and the base and the cover are configured so that the lines can remain taut and without slack between each port and the connection faces of the connector adapter when the adapter is mounted on the base; and wherein, at each port, an edge of the base is formed to be substantially flush with the supporting surface so that when the communication lines are adhered to the supporting surface at each port, any adverse visual impact of the lines is minimized or avoided at or near the adapter module, and, at each port, a narrow area of the base is inclined upward from the supporting surface to guide the communication lines from the surface toward the connector adapter when the adapter is mounted on the base.

2. An adapter module according to claim 1, wherein the cover has a cutout at each port of the module to provide safe clearance for the first and the second communication lines when entering the ports and when the module is closed by the cover.

3. An adapter module according to claim 1, wherein the module measures approximately 6.500 inches in length and 0.904 inch in width when closed by the cover.

4. An adapter module according to claim 3, wherein the module measures approximately 0.540 inch in depth when closed by the cover.

5. An adapter module according to claim 1, wherein the narrow area of the base at each port is inclined upward from the supporting surface at an angle of approximately 8 degrees.

6. An adapter module according to claim 1, wherein the ports are configured for receiving communication lines having outer diameters ranging from about 900 μm to 4.2 mm.

7. An adapter module according to claim 1, wherein the base and the cover are molded from polypropylene copolymer.

8. An adapter module according to claim 1, wherein the ports are located at rear corners of the module.

9. A method of operatively connecting two communication lines to one another at a certain location over a determined routing path at customer premises, comprising:

providing an adapter module according to claim 1;

mounting the connector adapter between the vertically extending guides on the base of the adapter module with the connectors at the ends of the communication lines mated to the connection faces of the adapter, before the base is fastened to a supporting surface at the certain location over the routing path;

marking the position of the adapter module on the supporting surface at the certain location over the routing path;

after the marking step, removing the connector adapter from between the vertically extending guides on the base of the module together with the connectors at the ends of the communication lines;

fastening the base of the module to the supporting surface at the certain location over the routing path; and re-mounting the connector adapter between the vertically extending guides on the base of the adapter module together with the connectors at the ends of the communication lines.

10. An adapter module according to claim 1, wherein the guides extending upward from the base have vertical recesses, and the side walls of the connector adapter have projecting flanges arranged to be received in the recesses in the guides to prevent axial displacement of the connector adapter when the adapter is inserted between the guides.

11. An adapter module according to claim 1, wherein the connector adapter is configured for operatively connecting first and second optical fiber communication lines to one another.

12. An adapter module according to claim 1, wherein the connector adapter is configured for operatively connecting first and second copper wire communication lines to one another.

* * * * *